(12) United States Patent
Ngoi et al.

(10) Patent No.: US 6,195,208 B1
(45) Date of Patent: Feb. 27, 2001

(54) SINGLE ASPHERICAL LENS FOR DE-ASTIGMATISM, COLLIMATION, AND CIRCULATION OF LASER BEAMS

(76) Inventors: Bryan Kok Ann Ngoi, Nanyang Technological University, School of Mechanical and Production Engineering, Nanyang Avenue, Singapore (SG), 639798; Zhou Xiaoqun, 100 Nanyang Crescent, Block L #06-05, Nanyang Technological University, Singapore (SG), 637819; Koh Soon Seong, Nanyang Technological University, School of Mechanical and Production Engineering, Nanyang Avenue, Singapore (SG), 639798

( * ) Notice: Subject to any disclaimer, the term of this patent is extended or adjusted under 35 U.S.C. 154(b) by 0 days.

(21) Appl. No.: 09/421,539

(22) Filed: Oct. 20, 1999

(51) Int. Cl.[7] .............................. G02B 27/30; G02B 3/02
(52) U.S. Cl. ......................................... 359/641; 359/708
(58) Field of Search .......................... 359/641, 708–718, 359/719

(56) References Cited

U.S. PATENT DOCUMENTS

| 4,318,594 | 3/1982 | Hanada | 350/433 |
|---|---|---|---|
| 4,575,194 | 3/1986 | Streifer et al. | 350/413 |
| 4,643,538 | 2/1987 | Wilson | 350/421 |
| 4,734,906 | 3/1988 | Baer et al. | 363/112 |
| 4,810,069 | 3/1989 | Kobayashi | 350/413 |
| 5,159,491 | 10/1992 | Richards | 359/641 |
| 5,239,414 | 8/1993 | Reno | 359/669 |
| 5,251,060 | 10/1993 | Uenishi et al. | 359/328 |
| 5,553,174 | 9/1996 | Snyder | 385/15 |
| 5,572,367 | 11/1996 | Jung et al. | 359/708 |

*Primary Examiner*—Ricky Mack
(74) *Attorney, Agent, or Firm*—Burns, Doane, Swecker & Mathis, L.L.P.

(57) ABSTRACT

An astigmatic and non-circular diverging input laser beam is converted into a collimated and circular output laser beam with its astigmatism corrected using a single aspherical lens. The input surface has a concave aspherical profile in the transverse direction and a convex aspherical profile in the longitudinal direction respectively for astigmatism correction. The output surface has a convex aspherical profile in the transverse direction and a non-curved profile in the longitudinal direction respectively for collimation and circularization of the final output laser beam.

16 Claims, 5 Drawing Sheets

SINGLE ASPHERICAL LENS FOR DE-ASTIGMATISM, COLLIMATION, AND CIRCULATION OF LASER BEAMS

FIELD OF THE INVENTION

The present invention generally relates to the field of optical elements for improving the characteristics of light beams emitted from semiconductor laser diodes. More particularly, the invention relates to a special single aspherical lens used to simultaneously correct astigmatism, provide collimation, and correct cross-sectional shape of light beams emitted from semiconductor laser diodes that are used as light sources in optical systems requiring diffraction limited spot size, such as optical data storage systems and laser beam printer.

BACKGROUND OF THE INVENTION

An elliptical and divergent laser beam generated from a gain-guided laser diode is illustrated in FIG. 1. The virtual source point 1a from longitudinal cross section beam is located at the output facet of the laser diode, but the other virtual source point 2a from transverse cross section beam is displaced a distance behind the facet. The distance between 1a to 2a is defined as inherent astigmatism. Further, the divergence angle 3a of longitudinal ray 1 is relatively greater than divergence angle 3b of transverse ray 2. The ratio of the divergence angles typically ranges from 2:1 to 6:1 for various semiconductor laser diodes. Because there are two virtual source points along the optical axis 3, collimation of the elliptically diverging beam into a parallel beam cannot be achieved using a rotationally symmetric lens. For systems that require high resolution, it is important to correct the astigmatism in order to ultimately obtain the smallest (i.e., diffraction-limited) spot. Such correction can allow, for example, maximum storage density in an optical read/write head. Prior art approaches to this problem have used multiple optical elements such as cylindrical lenses and prisms as described in U.S. Pat. Nos. 4,643,538, 4,318,594, and 5,239,414, the disclosures of which are herein incorporated by reference. However, these methods increase both the total optical path and the size of the optical system and, further, introduce complexity in alignment procedures.

In many applications, the laser diode beam must not only be collimated but must also be corrected to a circular, rather than elliptical, cross-sectional shape. Prior art approaches for collimation and circularization have involved the conventional use of apertures as well as the use of external anamorphic prism pairs, micro-lenses, or multiple optical elements with graded indices of refraction as described in U.S. Pat. Nos. 4,734,906, 5,553,174, 4,810,069, and 5,251,060, the disclosures of which are herein incorporated by reference. Each of these approaches, however, suffers one or more drawbacks. The use of apertures reduces optical efficiency. In addition, anamorphic prism pairs are costly and increase both system size and assembly difficulties. Further, graded-index materials require additional processing to achieve the graded-index profile.

Other prior art approaches addressing circularization and collimation of elliptically diverging beams have focused on the use of single correcting optical elements. These approaches include the use of single lenses with aspherical or cylindrical surfaces and the use of graded-index single rods or fibers as described in U.S. Pat. Nos. 5,159,491, 5,572,367, and 4,575,194, the disclosures of which are herein incorporated by reference. These prior art approaches, however, have not realized the simultaneous correction of beam astigmatism, beam divergence, and non-circular beam shape in a single element.

Accordingly, an object of the present invention is to provide a single optical element which achieves a collimated and de-astigmatism beam profile corrected to a circular cross-section.

SUMMARY OF THE INVENTION

The aim of the invention is to collimate and shape a light beam while simultaneously correcting its astigmatism using a single aspherical lens instead of prisms, cylindrical lenses, and collimators. In order to achieve this function, the input surface (which faces the laser diode) of the single aspherical lens performs the astigmatism correction, and the output surface realizes collimation and circularization of the laser beams. Specifically, the input surface is designed with a convex aspherical profile in the longitudinal direction and a concave aspherical profile in the transverse direction for correcting astigmatism. That is, the input surface places the far virtual source point 2a at the near virtual source point 1a upon back tracing of the refracted rays. When the longitudinal ray from the near virtual source point reaches the specially designed convex longitudinal input surface of the lens, it is refracted parallel to the optical axis and becomes a parallel output beam. In contrast, the transverse ray from the far virtual source point impinges on the specially designed concave transverse input surface, which causes the incident ray to diverge further in the lens. When this refracted transverse ray reaches the same distance from the optical axis as the parallel output longitudinal ray, it is again refracted parallel to the optical axis by the specially designed convex transverse output surface. In this way, a collimated, circular, astigmatism-free beam can be obtained.

Thus, the single aspherical lens of the present invention provides a reduction in the number of elements for the desired functions, decreases the cost of manufacture, enables miniaturization, and reduces weight and alignment difficulty. It is readily apparent that the single aspherical lens of the present invention can be advantageously used in a variety of apparatuses having a semiconductor laser diode as a light source, such as laser beam printers, optical read/write heads. Further, the single aspherical lens of the present invention may be formed from glass and polymer materials.

BRIEF DESCRIPTION OF THE DRAWING FIGURES

DETAILED DESCRIPTION OF THE INVENTION

Figure 1:
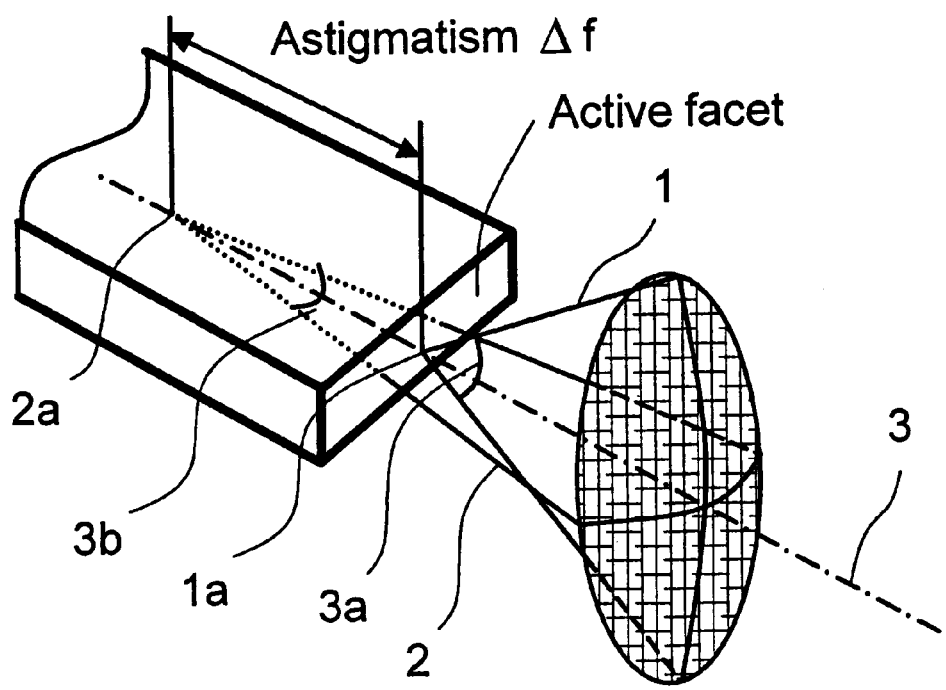
FIG. 1 is a perspective view illustrating an elliptically divergent light beam emitted from a laser diode source.
Figure 2:
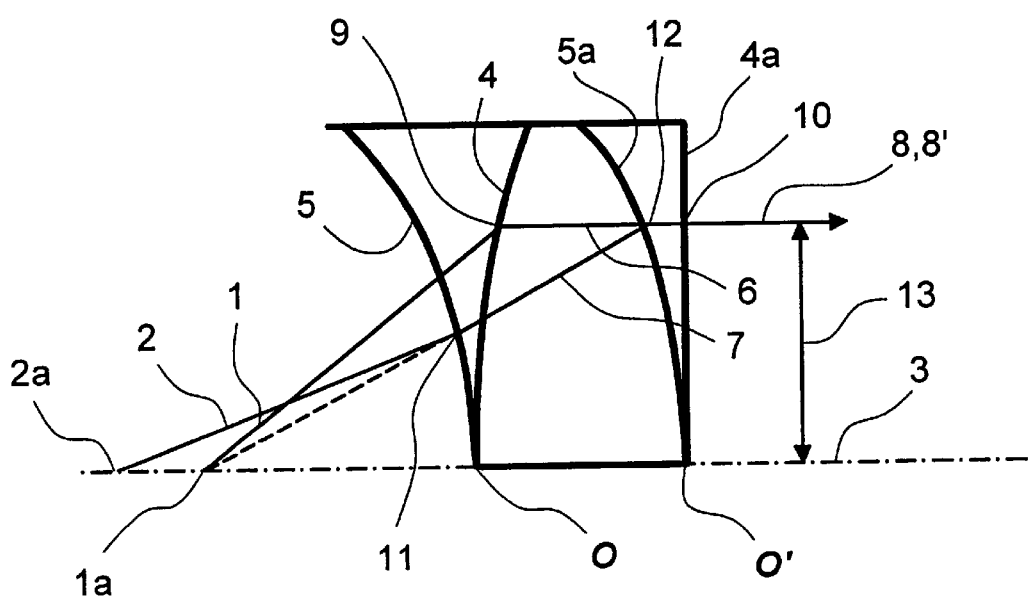
FIG. 2 is a schematic illustration showing the optical paths of light rays through transverse and longitudinal cross-sections of a lens according to the present invention.

The design of single aspherical lens may be understood by considering FIG. 2, which illustrates transverse and longitudinal cross sections through the single aspherical lens. It should be noted that only one-half of each cross section is illustrated in FIG. 2. Further, though actual transverse and longitudinal cross sections lie in orthogonal planes, they have been superimposed in the same plane in FIG. 2 to facilitate the ray-tracing analysis.

As illustrated in FIG. 2, longitudinal surfaces 4 and 4a represent input and output surfaces, respectively, of the longitudinal cross section. Likewise, transverse surfaces 5 and 5a represent input and output surfaces, respectively, of the transverse cross section.

Figure 3:
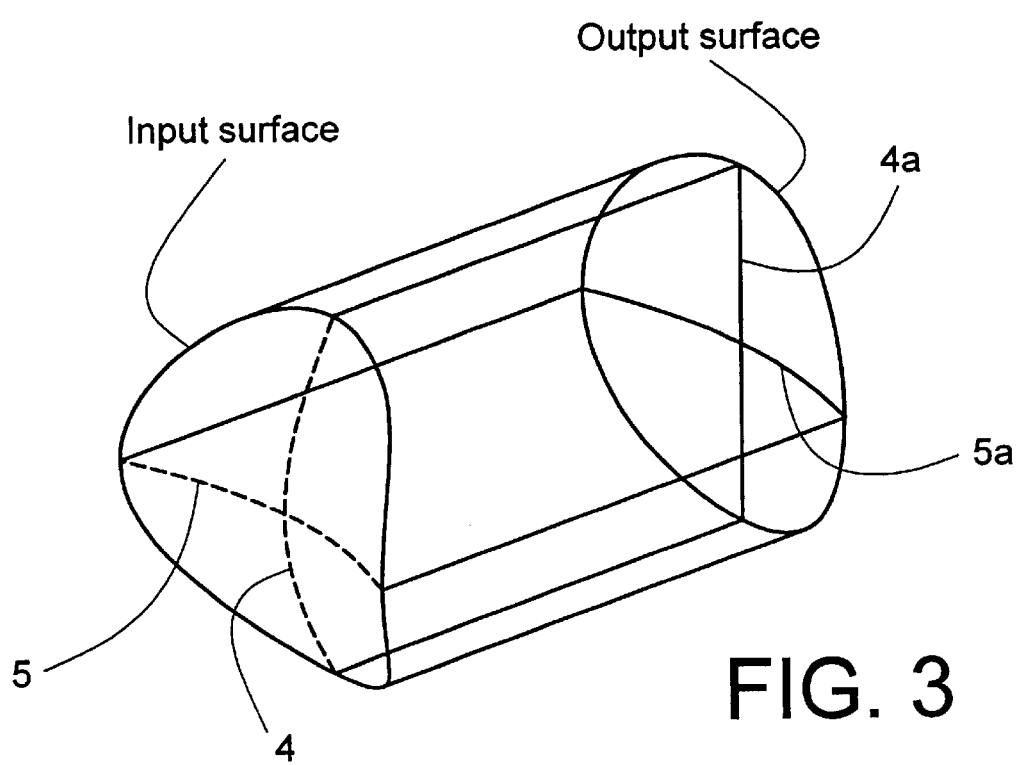
FIG. 3 is a perspective view illustrating a single aspherical lens according to the present invention.

Referring to FIG. 2, the design of longitudinal surfaces 4 and 4a and transverse surfaces 5 and 5a of an aspherical lens according to the present invention is accomplished by imposing geometrical ray conditions necessary to achieve the desired beam corrections for astigmatism, collimation, and shape. Numerical analysis based upon ray tracing and application of Fermat's principle then provides detailed equations that define the surfaces of the aspherical lens. Specifically, as shown in FIG. 2, longitudinal ray 1 is incident on input surface 4 at point 9 and is refracted parallel to the optical axis 3. Ray 6 propagates until it reaches output surface 4a at point 10 at a distance 13, where it exits as ray 8 without any refraction at the output surface 4a. Transverse ray 2 is incident on input surface 5 at point 11. Upon refraction, it further diverges into refracted ray 7. Refracted ray 7 propagates to point 12 on output surface 5a where, it is refracted and exits as ray 8' parallel to the optical axis 3 at the same distance as distance 13. In the absence of surface 5, when refracted ray 7 is back-traced (from surface 5a), it intercepts the optical axis at the longitudinal virtual source point 1a as indicated by the dotted line in FIG. 2. Thus, the input surface of the single aspherical lens corrects the astigmatism present in laser beam. Further, because refracted rays 6 and 7 exit from surfaces 4a and 5a respectively to form parallel beams 8 and 8' which lie equidistant from the optical axis 3, a collimated and circular output beam is also achieved. Note that rays 8 and 8' are superimposed in FIG. 2 because the transverse and longitudinal cross sections are superimposed in the construction of FIG. 2 as noted above. FIG. 3 illustrates a perspective view of such a single aspherical lens according to the present invention.

Figure 4:
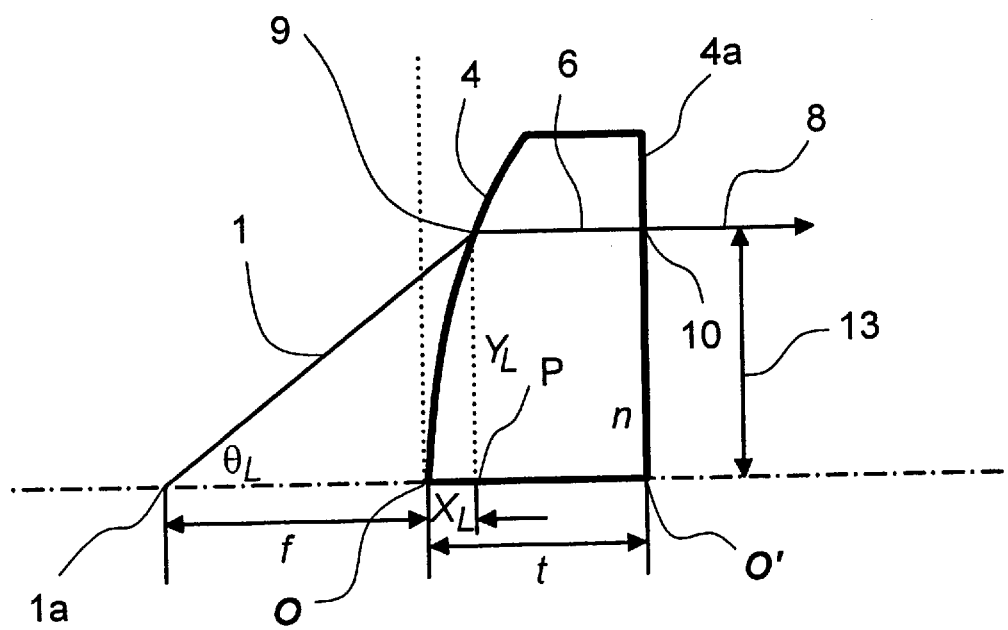
FIG. 4 is a schematic illustration showing the geometrical quantities used in the ray tracing equations for a longitudinal ray.

Referring to FIG. 4, the longitudinal input surface profile can be found by computing the optical path between the meridian ray 1 and a paraxial ray (from virtual source point 1a to point P) to be equal based on Fermat's principle:

$$f + nx_L = \sqrt{y_L^2 + (f + x_L)^2} \tag{1}$$

The above equation can be manipulated to obtain a hyperbolic equation:

$$\frac{(x_L + x_0)^2}{C^2} - \frac{y_L^2}{D^2} = 1 \tag{2}$$

where $$x_0 = \frac{f}{n+1},$$

$$C^2 = \frac{f^2}{(n+1)^2},$$

and $$D^2 = \frac{(n-1)f^2}{(n+1)}.$$

Knowing the longitudinal divergence angle $\theta_L$ and setting the value of $y_L$ equal to the output beam radius (the maximum value of $y_L$), f can be found by:

$$f = \frac{y_L(1 - n\cos\theta_L)}{(1 - n)\sin\theta_L} \tag{3}$$

Figure 5:
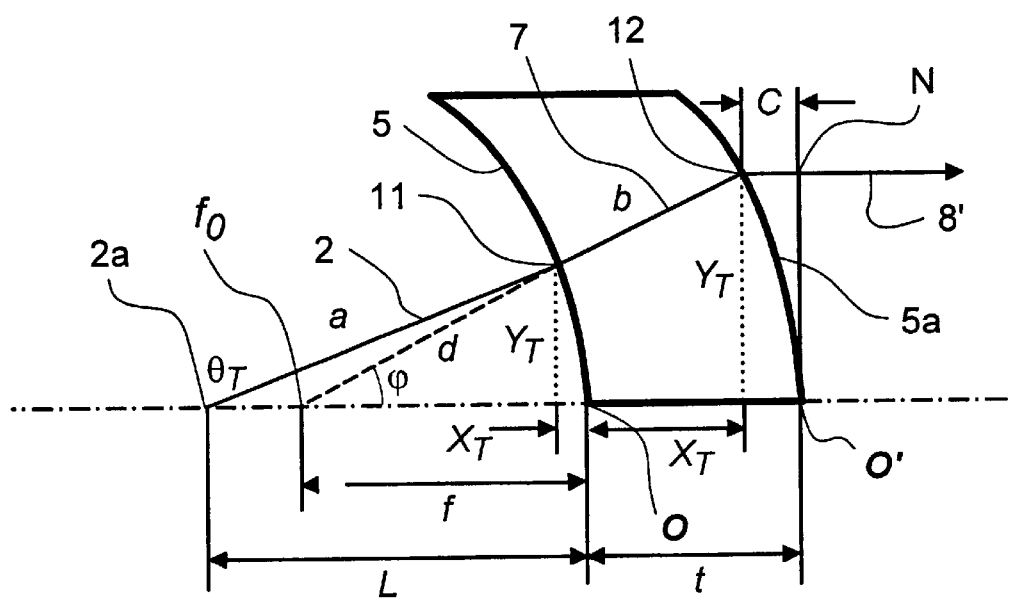
FIG. 5 is a schematic illustration showing the geometrical quantities used in the ray tracing equations for a transverse ray.

The configuration of the transverse input surface 5 and output surface 5a of the lens is determined by numerical analysis of the ray diagram shown in FIG. 5. As shown in FIG. 5, the lens is illustrated on a rectangular coordinate system with the origin placed at the vertex O of the first refractive surface 5. The refractive surface 5 separates atmospheric air with a refractive index of "1" on the left side and the lens material (glass, polymer) with a refractive index "n" on the right side. Consider the ray diagram shown in FIG. 5. Transverse ray 2 from virtual source point 2a is refracted at point 11 on surface 5 (that is, any point on surface 5) with coordinate $(x_T, y_T)$ and progresses into the aspherical lens. It is then refracted again and exits surface 5a as ray 8' parallel to optical axis 3 at point 12 on the surface 5a with coordinate $(X_T, Y_T)$. This ray will have the same optical path length as a paraxial ray from source point 2a to vertex O', according to Fermat's principle, giving $$a+nb+c=\Delta f+f+nt \tag{4}$$

where $\Delta f$ is the astigmatism present.

Referring to FIG. 5, back-tracing the refracted ray within the lens in the absence of surface 5 to the point of intersection with the optical axis 3 forms the corrected virtual focal point $f_0$ which coincides with virtual source point 1a. The optical path length between point $f_0$ and point N should be the same as the optical path length between point $f_0$ and vertex O', yielding $$nd+nb+c=nf+nt \tag{5}$$

Based upon the ray geometry of FIG. 5, Equation (4) and (5) leads to the formula for the transverse input surface as:

$$\sqrt{(\Delta f + f - x_T)^2 + y_T^2} - n\sqrt{(f - x_T)^2 + y_T 2} = \Delta f + f - nf \tag{6}$$

Equation (6) defines and allows the plotting of the surface profile of the transverse input surface of the aspherical lens.

According to Equation (5), the following elliptic function for the transverse output surface may be obtained:

$$\frac{(X_T + X_0)^2}{E_T^2} + \frac{Y_T^2}{F_T^2} = 1$$

$$X_0 = \frac{nf - t}{(n+1)}$$

$$E_T^2 = \frac{n^2(f+t)^2}{(n+1)^2}$$

$$F_T^2 = \frac{(n-1)n^2(f+t)^2}{(n+1)}$$

Knowing the transverse divergence angle $\theta_T$, index n, astigmatism present $\Delta f$ and setting the value for $Y_T$ equal to the output beam radius (i.e., equal to $y_L$ in Equation 3), the lens thickness t can be found as:

$$t = \frac{1}{n-1}\left\{nR\sqrt{\frac{(-\Delta f + y_T/\tan\theta_T)^2}{y_T^2} + 1} - \frac{R(-\Delta f + y_T/\tan\theta_T)}{y_T} + f(1-n)\right\},$$

Where $$y_T = \frac{(\Delta f - n^2\Delta f\cos\theta_T)\sin\theta_T}{1 - n^2} + \sqrt{\frac{[n^2\Delta f^2 - (f + \Delta f - fn)^2]\sin\theta_T}{1 - n^2} + \frac{(\Delta f - n^2\Delta f\cos\theta_T)^2\sin\theta_T^2}{(1 - n^2)^2}}.$$

The analysis described has been applied in a manner that makes virtual source point 2a shift to the right to coincide with virtual source point 1a (which is stationary) upon back-tracing the refracted rays as shown in FIG. 2. With the configurations of the input and output surfaces thus defined, an aspherical lens according to the present invention can be made from a glass material by grinding and polishing the surfaces of a glass lens body to the specified configurations. Alternatively, an aspherical lens mold can be made by machining a metallic or other material to the desired aspherical lens configuration. An aspherical lens according to the present invention can then be made by casting a resin material, a polymer material, a thermoplastic material, or the like within that mold and by subsequently removing the lens from the mold. Once made, the aspherical lens of the present invention can be positioned in the optical path of a light beam emitted from a semiconductor diode laser.

The principles, preferred embodiments and modes of operation of the present invention have been described in the foregoing specification. However, the invention that is intended to be protected is not to be construed as limited to the particular embodiments described. Those skilled in the art will particularly note that the invention described herein may be used in conjunction with a variety of light sources in addition to laser sources. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An aspherical lens for converting a diverging input light beam having a non-circular cross section perpendicular to an optical path and having astigmatism, into a collimated light beam having its astigmatism corrected and having a circular cross-section perpendicular to the optical path, the aspherical lens comprising:

a lens body having opposing first and second surfaces which respectively receive the input light beam having astigmatism and output the collimated light beam with its astigmatism corrected, the collimated light beam having a circular cross-section perpendicular to an optical axis of the lens body, the first surface having a configuration in which transverse and longitudinal components of the input light beam are refracted into the aspherical lens forming one apparent virtual source point on the optical axis in front of the aspherical lens, the second surface having a configuration in which the refracted transverse and longitudinal components of the input light beam reach the second surface at equal distances from the optical axis and exit the second surface in a direction parallel to the optical axis.

2. The aspherical lens of claim 1, wherein the first surface has a convex aspherical cross section in a longitudinal direction perpendicular to the optical axis and a concave aspherical cross section in a transverse direction perpendicular to the optical axis.

3. The aspherical lens of claim 1, wherein the second surface has a non-curved cross section in a longitudinal direction perpendicular to the optical axis and a convex aspherical cross section in a transverse direction perpendicular to the optical axis.

4. The aspherical lens of claim 2, wherein the convex aspherical cross section of the first surface in the longitudinal direction refracts the longitudinal components of the input light beam such that a longitudinal virtual source point of the longitudinal components remains stationary, and wherein the concave aspherical cross section of the first surface in the transverse direction refracts the transverse components of the input light beam such that the transverse components further diverge providing an apparent transverse virtual source point that coincides with the longitudinal virtual source point of the longitudinal components.

5. The aspherical lens of claim 1, wherein the longitudinal components of the input light beam have a longitudinal angle of divergence greater than a transverse angle of divergence of the transverse components of the input light beam.

6. The aspherical lens of claim 1, wherein the input light beam is a laser beam.

7. The aspherical lens of claim 5, wherein the laser beam is emitted from a semiconductor diode laser.

8. The aspherical lens of claim 1, wherein the lens body is formed from the group of materials consisting of glasses, resins, thermoplastics, and polymers.

9. A method for de-astigmatizing, collimating, and circularizing a diverging input light beam having a non-circular cross section perpendicular to an optical path and having astigmatism using a single aspherical lens having a lens body with opposing first and second surfaces comprising the steps of:

receiving the input light beam at the first surface of the aspherical lens wherein an optical axis of the aspherical lens is aligned with the optical path of the input light beam;

refracting the input light beam at the first surface such that the refracted transverse and longitudinal components of the input light beam have one apparent virtual source point in front of the aspherical lens on the optical axis and such that the refracted transverse and longitudinal components reach the second surface at equal distances from the optical axis; and refracting the refracted transverse and longitudinal components at the second surface such that the refracted transverse and longitudinal components exit the second surface in a direction parallel to the optical axis.

10. The method of claim 9, wherein the first surface has a convex aspherical cross section in a longitudinal direction perpendicular to the optical axis and a concave aspherical cross section in a transverse direction perpendicular to the optical axis.

11. The method of claim 9, wherein the second surface has a non-curved cross section in a longitudinal direction perpendicular to the optical axis and a convex aspherical cross section in a transverse direction perpendicular to the optical axis.

12. The method claim 10, wherein the convex aspherical cross section of the first surface in the longitudinal direction refracts the longitudinal components of the input light beam such that a longitudinal virtual source point of the longitudinal components remains stationary, and wherein the concave aspherical cross section of the first surface in the transverse direction refracts the transverse components of the input light beam such that the transverse components further diverge providing an apparent transverse virtual source point that coincides with the longitudinal virtual source point.

13. The method of claim 9, wherein the longitudinal components of the input light beam have a longitudinal angle of divergence greater than a transverse angle of divergence of the transverse components of the input light beam.

14. The method of claim 9, wherein the input light beam is a laser beam.

15. The method of claim 14, wherein the laser beam is emitted from a semiconductor diode laser.

16. The method of claim 9, wherein the lens body is formed from the group of materials consisting of glasses, resins, thermoplastics, and polymers.

* * * * *